US009766785B2

(12) United States Patent
Lee et al.

(10) Patent No.: US 9,766,785 B2
(45) Date of Patent: Sep. 19, 2017

(54) SELECTIVELY TRANFERRING IMAGE DATA FROM USER EQUIPMENT TO EXTERNAL DEVICE

(71) Applicant: KT CORPORATION, Gyeonggi-do (KR)

(72) Inventors: Jung-Wook Lee, Gyeonggi-do (KR); You-Jin Kang, Seoul (KR); Seung-Woo Lee, Seoul (KR); Jae-Uk Cha, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 13/726,384

(22) Filed: Dec. 24, 2012

(65) Prior Publication Data

US 2013/0167040 A1 Jun. 27, 2013

(30) Foreign Application Priority Data

Dec. 22, 2011 (KR) ........................ 10-2011-0140296

(51) Int. Cl.
*G06F 15/177* (2006.01)
*G06F 3/0484* (2013.01)
*H04N 1/00* (2006.01)
*G06F 3/14* (2006.01)
*H04N 1/32* (2006.01)
*H04N 101/00* (2006.01)

(52) U.S. Cl.
CPC ..... *G06F 3/04842* (2013.01); *H04N 1/00129* (2013.01); *H04N 1/00307* (2013.01);
(Continued)

(58) Field of Classification Search
CPC .... G06F 3/1454; G06F 3/0488; G06F 3/1423; G06F 3/0484; H04M 1/7253; H04N 2201/0084; H04N 2101/00
(Continued)

(56) References Cited

U.S. PATENT DOCUMENTS 5,832,471 A 11/1998 Fukui
5,875,312 A 2/1999 Walsh et al.
(Continued)

FOREIGN PATENT DOCUMENTS

JP 2000-163361 A 6/2000
JP 2003-316563 A 11/2003
(Continued)

OTHER PUBLICATIONS

Daniel Lawson NPL Oct. 2011—How to turn off notification; src: http://apple.stackexchange.com/questions/28883/how-can-i-turn-off-push-notifications-for-individual-apps-in-ios-5; obtained date: Aug. 26, 2014.
(Continued)

*Primary Examiner* — Tuyetlien T Tran
(74) *Attorney, Agent, or Firm* — IP Legal Services, LLC

(57) ABSTRACT

Described embodiments provide a method and user equipment for selectively transferring image data from user equipment to a coupled external device. The method may include determining whether user equipment is coupled to an external device, receiving selection inputs from a user for selecting at least one of applications installed in the user equipment when the user equipment is determined as being coupled to the external device, and selectively transferring image data produced in the user equipment based on the selected application. The method may further include controlling the coupled external device to display the transferred image data on a display unit of the coupled external device.

18 Claims, 8 Drawing Sheets

(52) U.S. Cl.
CPC .......... *G06F 3/0484* (2013.01); *G06F 3/1423* (2013.01); *G06F 3/1454* (2013.01); *H04N 1/32106* (2013.01); *H04N 2101/00* (2013.01); *H04N 2201/0039* (2013.01); *H04N 2201/0041* (2013.01); *H04N 2201/0049* (2013.01); *H04N 2201/0055* (2013.01); *H04N 2201/0058* (2013.01); *H04N 2201/0084* (2013.01); *H04N 2201/0089* (2013.01); *H04N 2201/0098* (2013.01); *H04N 2201/3204* (2013.01); *H04N 2201/3276* (2013.01)

(58) Field of Classification Search
USPC ......... 345/156, 1.1, 214; 715/740, 753, 719, 715/748, 761; 710/703
See application file for complete search history.

(56) References Cited

U.S. PATENT DOCUMENTS

| | | |
|---|---|---|
| 6,286,066 B1 | 9/2001 | Hayes et al. |
| 6,401,157 B1 | 6/2002 | Nguyen et al. |
| 6,516,367 B1 | 2/2003 | Barenys et al. |
| 6,535,947 B1 | 3/2003 | Amoni et al. |
| 6,600,840 B1 | 7/2003 | McCrossin et al. |
| 6,697,892 B1 | 2/2004 | Laity et al. |
| 6,804,740 B1 | 10/2004 | Watts, Jr. |
| 6,862,724 B1 | 3/2005 | Riley et al. |
| 6,915,368 B2 | 7/2005 | Lin |
| 6,934,788 B2 | 8/2005 | Laity et al. |
| 7,076,536 B2 | 7/2006 | Chiloyan et al. |
| 7,117,388 B2 | 10/2006 | Arimilli et al. |
| 7,165,109 B2 | 1/2007 | Chiloyan et al. |
| 7,196,676 B2 | 3/2007 | Nakamura et al. |
| 7,199,787 B2 | 4/2007 | Lee et al. |
| 7,228,366 B2 | 6/2007 | Abramson et al. |
| 7,266,779 B2 | 9/2007 | Baek et al. |
| 7,312,764 B2 * | 12/2007 | Driver et al. .................. 345/1.1 |
| 7,386,868 B2 | 6/2008 | McCormack |
| 7,533,408 B1 | 5/2009 | Arnouse |
| 7,685,322 B2 | 3/2010 | Bhesania et al. |
| 7,853,944 B2 | 12/2010 | Choe |
| 7,884,836 B2 | 2/2011 | Hussain |
| 8,214,545 B2 | 7/2012 | Khan et al. |
| 8,250,277 B2 * | 8/2012 | Tseng et al. .................. 710/303 |
| 8,281,366 B1 | 10/2012 | McCorkendale et al. |
| 2002/0083228 A1 | 6/2002 | Chiloyan et al. |
| 2002/0121548 A1 | 9/2002 | Lu |
| 2003/0231143 A1 | 12/2003 | Nakamura et al. |
| 2004/0006690 A1 | 1/2004 | Du et al. |
| 2004/0160193 A1 | 8/2004 | Cha et al. |
| 2004/0210321 A1 | 10/2004 | Hayashi et al. |
| 2004/0218036 A1* | 11/2004 | Boss et al. .................. 348/14.08 |
| 2004/0257385 A1 | 12/2004 | Kim et al. |
| 2004/0266425 A1 | 12/2004 | Gonsalves et al. |
| 2005/0257052 A1 | 11/2005 | Asai et al. |
| 2006/0036788 A1 | 2/2006 | Galang et al. |
| 2006/0132473 A1* | 6/2006 | Fuller et al. .................. 345/204 |
| 2006/0190652 A1 | 8/2006 | Keely et al. |
| 2007/0077965 A1 | 4/2007 | Fox |
| 2007/0171239 A1 | 7/2007 | Hunt et al. |
| 2007/0239844 A1 | 10/2007 | Yokoyama et al. |
| 2007/0245398 A1 | 10/2007 | Roden |
| 2007/0257927 A1 | 11/2007 | Sakanishi et al. |
| 2008/0144051 A1 | 6/2008 | Voltz et al. |
| 2008/0152305 A1 | 6/2008 | Ziegler |
| 2008/0225013 A1 | 9/2008 | Muylkens et al. |
| 2008/0303746 A1 | 12/2008 | Schlottmann et al. |
| 2009/0049554 A1 | 2/2009 | Vuong et al. |
| 2009/0109822 A1 | 4/2009 | Hung |
| 2009/0163139 A1 | 6/2009 | Wright-Riley |
| 2009/0178097 A1 | 7/2009 | Kim et al. |
| 2009/0231485 A1 | 9/2009 | Steinke |
| 2010/0064228 A1* | 3/2010 | Tsern .................. 715/740 |
| 2010/0064248 A1 | 3/2010 | Lee et al. |
| 2010/0066698 A1 | 3/2010 | Seo |
| 2010/0153501 A1 | 6/2010 | Gabriel et al. |
| 2010/0251243 A1 | 9/2010 | Gill et al. |
| 2010/0265652 A1 | 10/2010 | Agata et al. |
| 2010/0318709 A1 | 12/2010 | Bell et al. |
| 2011/0034242 A1 | 2/2011 | Aronzon et al. |
| 2011/0037711 A1* | 2/2011 | Siddiqui et al. .............. 345/173 |
| 2011/0083140 A1* | 4/2011 | Kim .................. H04N 5/46  725/28 |
| 2011/0098087 A1 | 4/2011 | Tseng |
| 2011/0102554 A1 | 5/2011 | Saito et al. |
| 2011/0134047 A1 | 6/2011 | Wigdor et al. |
| 2011/0138327 A1 | 6/2011 | Scott et al. |
| 2011/0202872 A1 | 8/2011 | Park |
| 2011/0275391 A1 | 11/2011 | Lee et al. |
| 2011/0285916 A1 | 11/2011 | Takiduka |
| 2011/0296308 A1 | 12/2011 | Yi |
| 2011/0306389 A1 | 12/2011 | Nagayama |
| 2012/0011451 A1* | 1/2012 | Bansal .................. H04N 7/15  715/753 |
| 2012/0050183 A1* | 3/2012 | Lee .................. 345/173 |
| 2012/0050331 A1 | 3/2012 | Kanda |
| 2012/0062479 A1 | 3/2012 | Feldstein et al. |
| 2012/0088548 A1 | 4/2012 | Yun et al. |
| 2012/0117167 A1 | 5/2012 | Sadja et al. |
| 2012/0155325 A1 | 6/2012 | Eichen et al. |
| 2012/0155454 A1 | 6/2012 | Eichen et al. |
| 2012/0172088 A1 | 7/2012 | Kirch et al. |
| 2012/0280907 A1 | 11/2012 | Masaki et al. |
| 2012/0297207 A1 | 11/2012 | Carlsen et al. |
| 2012/0324041 A1 | 12/2012 | Gerber et al. |
| 2013/0033414 A1 | 2/2013 | Zheng et al. |
| 2013/0089202 A1 | 4/2013 | Altmann |
| 2013/0104149 A1 | 4/2013 | Ahn et al. |
| 2014/0208276 A1 | 7/2014 | Park |

FOREIGN PATENT DOCUMENTS

| | | |
|---|---|---|
| JP | 2005-284657 A | 10/2005 |
| JP | 2006-094367 A | 4/2006 |
| JP | 2008-158342 A | 7/2008 |
| JP | 2011-142392 A | 7/2011 |
| JP | 2011-259253 A | 12/2011 |
| KR | 20-0290286 Y1 | 9/2002 |
| KR | 10-2004-0074759 A | 8/2004 |
| KR | 10-2005-0015125 A | 2/2005 |
| KR | 10-0487618 B1 | 5/2005 |
| KR | 10-2005-0096578 A | 10/2005 |
| KR | 10-2006-0018083 A | 2/2006 |
| KR | 10-2008-0027813 A | 3/2008 |
| KR | 10-2009-0092337 A | 8/2009 |
| KR | 10-2010-0032660 A | 3/2010 |
| KR | 10-2010-0039592 A | 4/2010 |
| KR | 10-2010-0108885 A | 10/2010 |
| KR | 20-2010-0009920 U | 10/2010 |
| KR | 10-2010-0128630 A | 12/2010 |
| KR | 10-2010-0133243 A | 12/2010 |
| KR | 10-2011-0030963 A | 3/2011 |
| KR | 10-1017866 B1 | 3/2011 |
| KR | 10-2011-0057930 A | 6/2011 |
| KR | 10-2011-0093541 A | 8/2011 |
| KR | 10-2011-0111857 A | 10/2011 |
| KR | 10-2011-0115489 A | 10/2011 |
| KR | 10-2011-0123348 A | 11/2011 |
| KR | 10-2011-0131439 A | 12/2011 |
| KR | 10-2011-0134495 A | 12/2011 |

OTHER PUBLICATIONS

MS Office 2007: Turn alrt on or off; src: https://support.office.com/en-ie/article/Turn-Desktop-Alerts-on-or-off-a83fe224-3109-4de0-a1ab-c33fd103a422; obtained date: Jan. 5, 2015.

* cited by examiner

SELECTIVELY TRANFERRING IMAGE DATA FROM USER EQUIPMENT TO EXTERNAL DEVICE

CROSS REFERENCE TO PRIOR APPLICATIONS

The present application claims priority under 35 U.S.C. §119 to Korean Patent Application No. 10-2011-0140296 (filed on Dec. 22, 2011), which is hereby incorporated by reference in its entirety.

The subject matter of this application is related to U.S. patent application Ser. No. 13/540,112 filed Jul. 2, 2012, U.S. patent application Ser. No. 13/539,929 filed Jul. 2, 2012, U.S. patent application Ser. No. 13/460,091 filed Apr. 30, 2012, U.S. patent application Ser. No. 13/598,741 filed Aug. 30, 2012, U.S. patent application Ser. No. 13/726,361 filed Dec. 24, 2012, U.S. patent application Ser. No. 13/726,811 filed Dec. 26, 2012, U.S. patent application Ser. No. 13/726,830 filed Dec. 26, 2012, U.S. patent application Ser. No. 13/726,404 filed Dec. 24, 2012, and U.S. patent application Ser. No. 13/726,422 filed Dec. 24, 2012, the teachings of which are incorporated herein their entirety by reference.

FIELD OF THE INVENTION

The present invention relates to user equipment and, in particular, to selectively transferring image data from user equipment to an external device.

BACKGROUND OF THE INVENTION

User equipment has advanced so as to perform multiple functions such as communicating voice and data with others; exchanging text messages or multimedia messages; sending e-mails; capturing a still or moving image; playing back a music or a video file, playing a game, and a receiving a broadcast signal. Lately, such multi-functional user equipment has received greater attention for new applications. Instead of using multiple independent devices, a user prefers to use single multifunction-enabled user equipment. Portability and/or mobility should be considered in design of user equipment, but such user equipment has limitations in size. Accordingly, there also are limitations in display screen size, screen resolution, and speaker performance.

In order to overcome such limitations, an external device having a large display size, better speaker performance, and connectable to a mobile terminal has been introduced. Such external device connected to the mobile terminal can provide data, music files, and other content stored in the mobile terminal in better performance.

For example, user equipment may be coupled to an external device having a large sized screen such as a TV or a projector and display image data through the external device. In this case, the external device displays mirrored image data that is exactly same as image data displayed on user equipment. Due to such a typical way of transferring image data from the user equipment to the coupled external device, a user might not desire to show all image data produced in the user equipment on the external device. For example, while displaying a presentation material on a larger screen TV coupled to the user equipment, a user might receive a text message from other party. When such text message has very private content, a corresponding user might be very embarrassed and audiences thereof might be greatly distracted.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, image data may be selectively displayed on an external device coupled to user equipment.

In accordance with another aspect of the present invention, image data may be selectively transferred from user equipment to a coupled external device.

In accordance with another aspect of the present invention, predetermined applications installed in user equipment may be selected and image data produced by the selected applications may be only transferred to a coupled external device for displaying.

In accordance with at least one embodiment of the present invention, a method may be provided for selectively transferring image data from user equipment to a coupled external device. The method may include determining whether user equipment is coupled to an external device, receiving selection inputs from a user for selecting at least one of applications installed in the user equipment when the user equipment is determined as being coupled to the external device, and selectively transferring image data produced in the user equipment based on the selected application. The method may further include controlling the coupled external device to display the transferred image data on a display unit of the coupled external device.

The receiving selection inputs from a user may include providing a user interface to the user for selecting the applications and for selecting one of a positive image data transfer option, a negative image data transfer option, and a mirrored image data transfer option, as an image data transfer option associated with the coupled external device; and receiving the selection inputs for selecting the applications and for setting the image data transfer option.

The receiving selection inputs from a user may further include determining whether the user wants to register the coupled external device as a preregistered device with information on the selected applications and the selected image data transfer options after the receiving the selection inputs, and storing the coupled external device as the preregistered device and the information on the selected applications and the selected image data transfer option in a memory of the user equipment when the user wants to register the coupled external device as a preregistered device.

The selectively transferring image data may include transferring image data produced by the selected applications to the coupled external device when the positive image data transfer option is selected as the image data transfer option associated with the coupled external device.

The selectively transferring image data may include restricting image data produced by the selected applications from being transferring to the coupled external device when the negative image data transfer option is selected as the image data transfer option associated with the coupled external device.

The selectively transferring image data may include transferring image data produced by all of the applications installed in the user equipment to the coupled external device when the mirrored image data transfer option is selected as the image data transfer option associated with the coupled external device.

The method may further include determining whether the coupled external device is a preregistered device or a non-registered device after detecting the connection to the external device, retrieving, from memory of the user equipment, information on selected applications and an image data transfer option associated with the coupled external device when the coupled external device is determined as the preregistered device, and selectively transferring image data to the coupled external device based on the retrieved information on the selected application and the image data transfer option, associated with the coupled external device.

The method may further include providing a user interface for selecting applications and for selecting one of a positive image data transfer option, a negative image data transfer option, and a mirrored image data transfer option, as an image data transfer option associated with the coupled external device when the coupled external device is determined as the non-registered device.

The method may further include determining whether the coupled external device is a preregistered device or a non-registered device after detecting the connection to the external device and transferring image data produced by all applications installed in the user equipment to the coupled external device when the coupled external device is determined as the preregistered device.

The method may further include establishing a host-device connection when the user equipment is determined as being coupled to an external device.

The establishing may include obtaining display device information of the coupled external device, determining whether to reconfigure an initial display setting of the user equipment based on the obtained display device information, reconfiguring the initial display setting based on the obtained display device information and storing as a host-device connection display setting associated with the coupled external device when the reconfiguration is necessary, otherwise, storing the initial display setting as the host-device connection display setting associated with the coupled external device.

The method may further include controlling the coupled external device to display the selectively transferred image data on a display unit of the coupled external device based on the host-device connection display setting. The display device information may include a device identity (ID), a screen size, a display direction, and a dot per inch (DPI).

In accordance with another embodiment of the present invention, user equipment may be provided for selectively transferring image data to a coupled external device. The user equipment may include an interface unit, an input unit, a display unit, a controller, and a memory. The interface unit may be configured to be connected to a corresponding interface unit of an external device, to generate a detection signal when the user equipment is coupled to an external device, to transmit and receive data to/from an external device, and to transfer image data produced by applications installed in the user equipment to a coupled external device. The input unit may be configured to receive selection inputs from a user for selecting at least one of applications and for selecting one of a positive image data transfer option, a negative image data transfer option, and a mirrored image data transfer option as an image data transfer option. The display unit may be configured to display image data produced by applications installed in the user equipment and to display a user interface for enabling the user to select at least one of applications and to select one of a positive image data transfer option, a negative image data transfer option, and a mirrored image data transfer option as an image data transfer option associated with the coupled external device. The controller may be configured to determine that the user equipment is coupled to an external device upon the reception of the generated detection signal of the interface unit, to set an image data transfer option of the coupled external device based on the received selection input with the selected at least one applications, and to selectively transfer image data produced in the user equipment based on the set image data transfer option with the selected application to the coupled external device. The memory may be configured to store information on a coupled external device and information on the selected application and the selected image data transfer option associated with a coupled external device.

The controller may be configured to transfer image data produced by the selected at least one application to the coupled external device when the positive image data transfer option is selected as the image data transfer option associated with the coupled external device, to restrict image data produced by the selected at least one application from being transferring to the coupled external device when the negative image data transfer option is selected as the image data transfer option associated with the coupled external device, and to transfer image data produced by all of the applications installed in the user equipment to the coupled external device when the mirrored image data transfer option is selected as the image data transfer option associated with the coupled external device.

The controller may be configured to determine whether the coupled external device is a preregistered device or a non-registered device after detecting the connection to the external device, to retrieve, from the memory, information on selected applications and an image data transfer option associated with the coupled external device when the coupled external device is determined as the preregistered device, and to selectively transfer image data to the coupled external device based on the retrieved information on the selected application and the image data transfer option, associated with the coupled external device.

The controller may be configured to provide, through the display unit, the user interface for selecting applications and for selecting one of a positive image data transfer option, a negative image data transfer option, and a mirrored image data transfer option, as an image data transfer option associated with the coupled external device when the coupled external device is determined as the non-registered device.

The controller may be configured to obtain display device information of the coupled external device upon the receipt of the detection signal from the interface unit, to determine whether to reconfigure an initial display setting of the display unit of the user equipment based on the obtained display device information, to reconfigure the initial display setting based on the obtained display device information and store as a host-device connection display setting associated with the coupled external device when the reconfiguration is necessary, otherwise, store the initial display setting as the host-device connection display setting associated with the coupled external device.

The controller may be configured to control the coupled external device to display the selectively transferred image data on a display unit of the coupled external device based on the host-device connection display setting.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
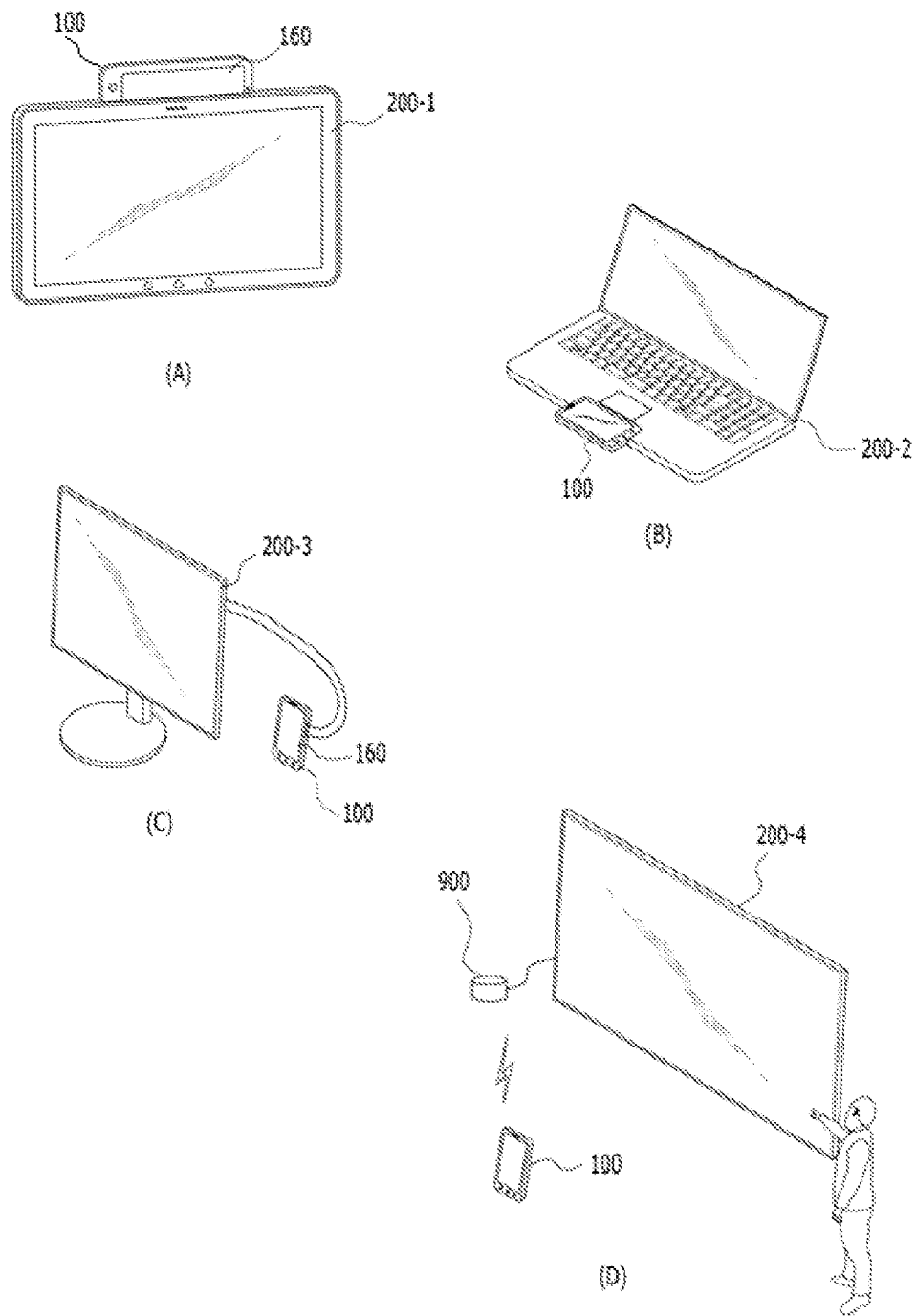
FIG. 1 shows various external devices connected to user equipment in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, image data may be selectively transferred from user equipment to a coupled external device and the selectively transferred image data may be displayed on a display unit of the coupled external device. The user equipment may be coupled to various types of external devices. Such external devices will be described with reference to FIG. 1 and FIG. 2. For convenience and ease of understanding, user equipment will be described as a mobile terminal such as a mobile phone or a smart phone throughout the accompanying drawings. The present invention, however, is not limited thereto.

FIG. 1 shows various external devices connected to user equipment in accordance with at least one embodiment of the present invention.

Referring to FIG. 1, user equipment 100 is an image data source device that may be coupled to various types of external devices. For example, user equipment 100 may be coupled to pad type device 200-1 as shown in a diagram (A) and coupled to laptop type device 200-2 as shown in a diagram (B). Furthermore, user equipment 100 may be coupled to monitor 200-3 as shown in a diagram (C) and coupled to large sized screen 200-4 as shown in a diagram (D). Although not illustrated in FIG. 1, other types of devices may be coupled to user equipment 100 as an external device for displaying image data produced by user equipment 100.

Figure 3:
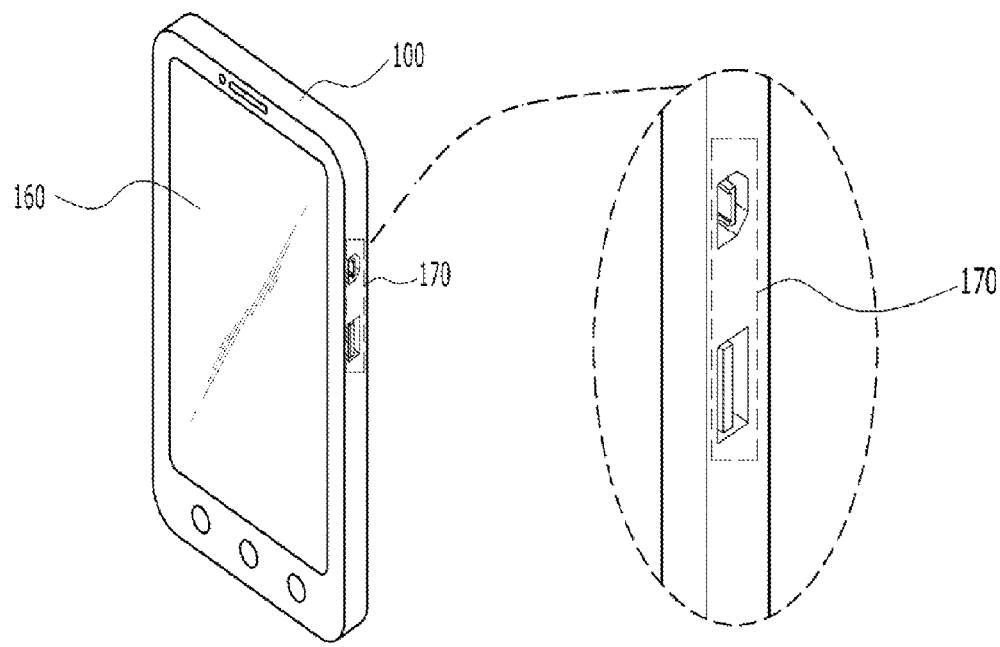
FIG. 3 shows user equipment in accordance with embodiments of the present invention.
Figure 5:
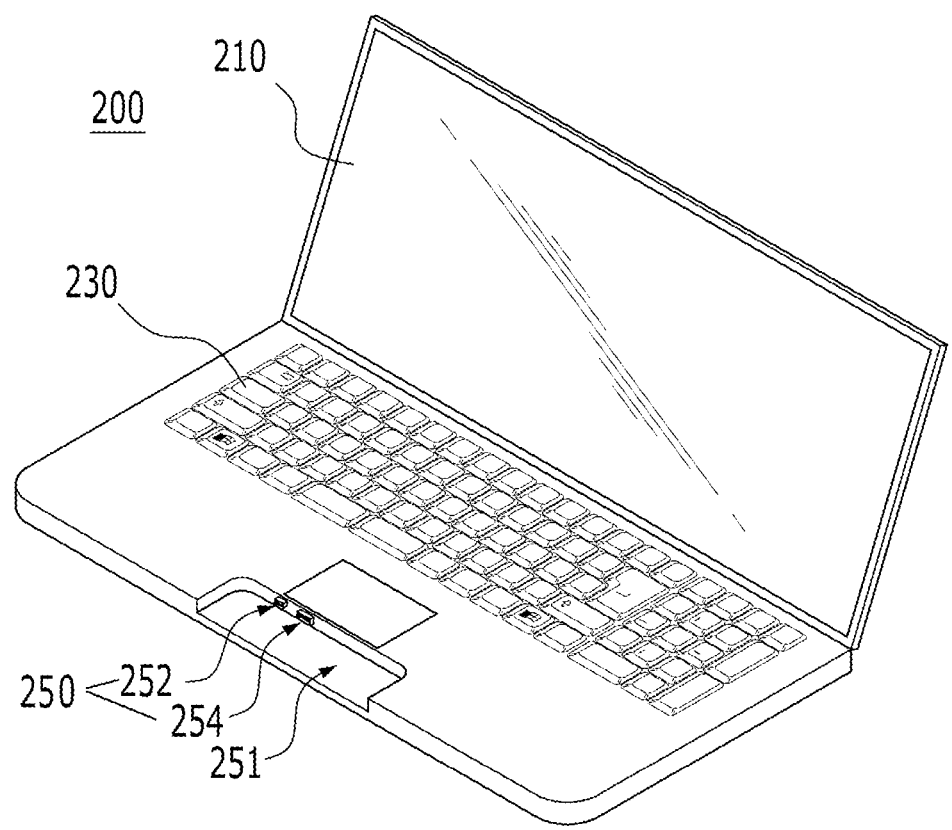
FIG. 5 shows an external device in accordance with at least one embodiment of the present invention.

User equipment 100 may be coupled to an external device in various manners. For such connection, user equipment 100 and the external device may include input/output ports 170 and 250 (FIG. 3 and FIG. 5). For example, user equipment 100 may be docked at a docking bay of an external device. As shown in the diagrams (A) and (B), pad type device 200-1 and laptop computer 200-2 may include a docking bay specially designed to receive user equipment 100. Furthermore, user equipment 100 may be coupled to an external device through a physical cable. As shown in the diagram (C), user equipment 100 may be coupled to monitor 200-3 through a physical cable such as a video and/or audio input/output cable. In addition, user equipment 100 may be coupled to an external device through a wireless manner such as Wi-Fi®, Wi-Fi® direct, and wireless high definition multimedia interface (HDMI). As shown in the diagram (D), user equipment 100 may be coupled to large sized screen 200-4 through signal receiving device 900 for receiving an image data signal from user equipment 100 through a wireless link.

As described, user equipment 100 may be directly coupled to the external device, but the present invention is not limited thereto. User equipment 100 may be indirectly coupled to the external device as shown in FIG. 2.

Figure 2:
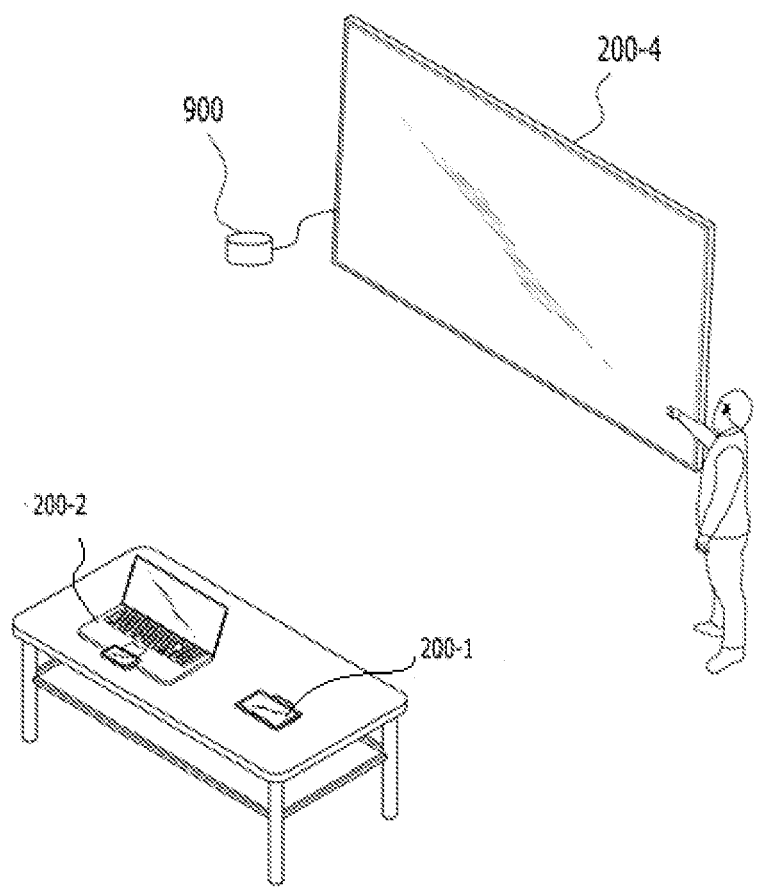
FIG. 2 shows an external display device indirectly connected to user equipment in accordance with at least one embodiment of the present invention.

FIG. 2 shows an external display device indirectly connected user equipment in accordance with at least one embodiment of the present invention.

Referring to FIG. 2, user equipment 100 may be coupled to an external device indirectly through a hub device. For example, user equipment 100 may be indirectly coupled to external display device 200-4 through laptop device 200-2 as a hub device. Furthermore, user equipment 100 may be indirectly coupled to external device 200-4 through pad type device 200-1 as a hub device. In this case, laptop device 200-2 and pad type device 200-1 may be a docking device specially designed for user equipment 100. Such laptop device 200-2 and pad type device 200-1 may be a dummy device having minimum processing power for enhancing performance of user equipment 100. Laptop device 200-2 and pad type device 200-1 may have features enhancing the performance of user equipment 100, such as a larger screen size, a better speaker, a convenient input device such as a wider keyboard and touch pad, and various interfaces for an external device.

Such a hub device may receive image data produced in user equipment 100 and transfer the received image data to an external display device. In addition, the hub device may modify the image data received from user equipment 100 to be adjusted for the external device. After modification, the hub device may transfer the modified image data to the external device.

After user equipment 100 is coupled to the external device, user equipment 100 may exchange data with external device 200 through predetermined coupling interfaces such as port units 170 and 250. Particularly, user equipment 100 may operate as an image data source device and transfer image data produced in user equipment 100 to the coupled external device. The coupled external device may receive and display the image data from user equipment 100 in response to the control of user equipment 100. Typically, user equipment 100 transfers entire image data to the coupled external device. That is, the external device displays mirrored image data that is exactly same as image data displayed on user equipment. Due to such a typical way of transferring image data from the user equipment to the coupled external device, a user might be uncomfortable showing the entire image data produced in the user equipment. For example, while displaying a presentation material on a larger sized monitor coupled to the user equipment, the user equipment may receive a text message from other terminal. In this case, the received text message may be displayed on a top of the displayed presentation material. When such text message has very private content, a corresponding user might be very embarrassed and audience thereof might be much districted.

In order to overcome such disadvantage, image data may be selectively transferred from user equipment 100 to the external device in accordance with at least one embodiment of the present invention. Such operation will be described with reference to FIG. 7 and FIG. 8. Before describing the operation, user equipment 100 and the external device will be described with reference to FIG. 3 to FIG. 6. For convenience and ease of understanding, user equipment will be representatively described as a mobile phone or a smart phone through the specification, but the present invention is not limited thereof.

FIG. 3 shows user equipment in accordance with embodiments of the present invention.

Referring to FIG. 3, user equipment 100 may include display unit 160 and at least one port unit 170. Such port unit 170 may be referred to as an interface unit. Display unit 160 may display data according to display setting of user equipment 100. Display unit 160 may typically have about 4.5 inch display area which may be smaller than that of an external device, but the present invention is not limited thereto. For example, a display area of an external device may be smaller than that of user equipment 100.

At least one port unit 170 may be coupled to an external device and exchange data with the external device. User equipment 100 may be capable of processing data and transferring the processed data to an external device through port unit 170. Such a port unit 170 may include a high definition multimedia interface (HDMI) port and/or a universal serial bus (USB) port, but the present invention is not limited thereto. User equipment 100 may have a certain design or standardized interface connectable to an external device. For example, user equipment 100 may be attachable to and/or detachable from an external device. User equipment 100 may dock to an external device. User equipment 100 may be any electronic device that can perform the above and further operations described herein. For example, user equipment 100 may include, but is not limited to, a mobile terminal, a mobile device, a mobile phone, a portable terminal, a portable device, a handheld device, a cellular phone, a smart phone, a personal digital assistant (PDA), wireless local loop (WLL) station, a portable multimedia player (PMP), and a navigation device. The present invention, however, is not limited thereto, and other types of user equipment, such as mini-laptop PCs and other computing devices may incorporate embodiments of the present invention. User equipment 100 will be described in more detail with reference to FIG. 4.

Hereinafter, user equipment 100 will be described in more detail with reference to FIG. 4. As described above, user equipment 100 may be coupled to an external device, selectively transfer image data produced in user equipment 100 to the coupled external device, and control the coupled external device to display the transferred image data in accordance with at least one embodiment of the present invention.

Figure 4:
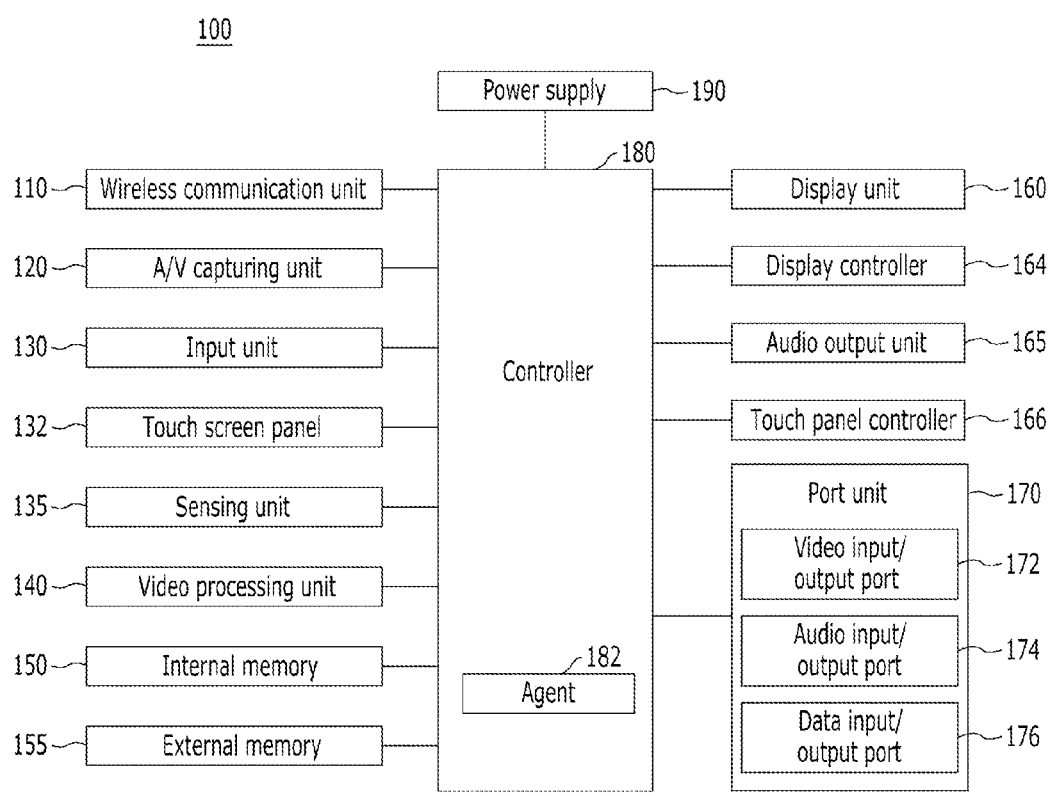
FIG. 4 is a block diagram illustrating user equipment in accordance with at least one embodiment of the present invention.

FIG. 4 is a block diagram illustrating user equipment in accordance with at least one embodiment of the present invention.

Referring to FIG. 4, user equipment 100 may include wireless communication unit 110, audio/video (A/V) input unit 120, input unit 130, sensing unit 135, video processing unit 140, internal memory 150, external memory 155, display unit 160, display controller 164, audio output unit 165, touch panel controller 166, port unit 170, controller 180, and power supply 190. Input unit 130 may include touch screen panel 132. Controller 180 may include an agent 182. Port unit 170 may include video input/output port 172, audio input/output port 174, and data input/output port 176. Power supply unit 190 may include a battery for electric charging. User equipment 100 may be described as including the above constituent elements, but the present invention is not limited thereto.

Wireless communication unit 110 may include at least one module for communicating with another party through a wireless communication system. For example, wireless communication unit 110 may include any or all of a broadcasting signal receiving module, a mobile communication module, a wireless Internet module, a short-distance communication module, and a location information module. In accordance with at least one embodiment of the present invention, wireless communication unit 110 may be not an essential unit for user equipment 100 because user equipment 100 may not necessarily be required to communicate with another party. Accordingly, wireless communication unit 110 may be omitted.

A/V capturing unit 120 may capture an audio signal and/or a video signal. For example, the A/V input unit 120 may include a camera and a microphone. The camera may process image frames of a still image or a moving image, which are captured by an image sensor in a video call mode or a photographing mode. The microphone may receive an audio signal provided externally in an on-call mode, a recording mode, or a voice recognition mode.

Input unit 130 may be a user interface for receiving input from a user. Such an input unit 130 may be realized in various types. For example, input unit 130 may include any of a keypad, a dome switch, a touch pad, a jog wheel, and a jog switch, but is not limited thereto.

In accordance with at least one embodiment of the present invention, user equipment 100 may be a full touch type smart phone. In this case, input unit 130 may include several hardware key buttons and a touch screen. The hardware key buttons may include a hold key and a volume control button. Touch screen panel 132 may be another input unit for receiving touch inputs in accordance with embodiments of the present invention. Touch screen panel 132 may be disposed on an upper surface of display unit 160, but the present invention is not limited thereto.

In accordance with at least one embodiment of the present invention, input unit 130 may be configured to receive selection inputs from a user for selecting at least one of several applications. Furthermore, input unit 130 may be configured to receive selection inputs for selecting one of a positive image data transfer option, a negative image data transfer option, and a mirrored image data transfer option, as an image data transfer option. For example, such selection inputs may be made based on a graphic user interface (GUI) provided to user through display unit 160. The GUI may be displayed with a list of applications installed in user equipment 100 and a list of the image data transfer options. Based on the GUI, a user may select at least one of applications and one of the image data transfer options. The GUI and the image data transfer options will be described in detail below with reference to FIG. 7.

Sensing unit 135 may detect a current status of user equipment 100. For example, sensing unit 135 may sense an opening or closing of a cover of user equipment 100, a location and a bearing of user equipment 100, acceleration and deceleration of user equipment 100, or physical contact with or proximity to a user. Based on the detected status of user equipment 100, sensing unit 135 may generate a sensing signal to control the operation of user equipment 100. For example, in the case of a mobile phone having a sliding type cover, sensing unit 135 may sense whether a cover is opened or closed. Sensing unit 135 may sense whether or not power supply 190 supplies power. Furthermore, sensing unit 135 may sense whether or not port unit 170 is coupled to external device 200. In this case, sensing unit 135 may receive a detection signal from port unit 170 when user equipment 100 is connected to external device 200 in accordance with an embodiment of the present invention. For example, sensing unit 135 may receive a detection signal from a hot plug detect (HPD) pin when port unit 170 includes a HDMI port. Based on the detection signal, controller 180 may determine that external device 200 is connected to user equipment 100. Upon the receipt of the detection signal, user equipment 100 may establish a host-device connection in accordance with at least one embodiment of the present invention. Such operation will be described in detail below with reference to FIG. 8.

Video processing unit 140 may process an image signal and/or image data under the control of controller 180. Particularly, video processing unit 140 may process image data according to a display setting determined based on display unit information of display unit 160. The display setting may include a screen size, a screen resolution, a display direction, and a dot per inch (DPI) value. The display setting may be determined by controller 180 based on display unit information of display unit 160. The display unit information may include a manufacturer, a model number, a device identifier (ID), a DPI value, a screen size, the number of pixels, supporting screen resolutions, supporting aspect ratios, refresh rates, and a response time. Video processing unit 140 may transmit the processed image data to display unit 160 of user equipment 100 in response to controller 180. Furthermore, video processing unit 140 may process image data to be transmitted to external device 200 when user equipment 100 is connected to external device 200. For example, video processing unit 140 may, reconfigure image data based on a display setting of external device 200 and generate a signal based on the reconfigured image data in response to controller 180. The present invention, however, is not limited thereto. Such an operation may be performed by controller 180. The image data may be data for displaying a graphic user interface produced by any software programs installed in user equipment 100, such as an operating system and applications installed in user equipment 100.

Internal memory 150 and external memory 155 may be used as a data storage device of user equipment 100. For example, internal memory 150 and external memory 155 may store information necessary for operating user equipment 100 and performing certain operations requested by a user. Such information may include any software programs and related data. For example, internal memory 150 and external memory 155 may store an operation system data, applications, and related data, received from an external device through a physical cable and downloaded from a related server through a communication link. In accordance with at least one embodiment of the present invention, internal memory 150 and/or external memory 155 may store information on display setting determined for display unit 160 or display unit 210 of external device 200. Furthermore, internal memory 150 and external memory 155 may store device unit information for candidate external devices connectable to user equipment 100. In addition, internal memory 150 and/or external memory 150 may store a DPI table (not shown). Internal memory 150 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. External memory 155 may be a SD card or a USB memory, but the present invention is not limited thereto. For example, external device 200 may function as external memory 155 when external device 200 is coupled to user equipment 100 in accordance with an embodiment of the present invention.

In accordance with at least one embodiment of the present invention, internal memory 150 may store information on a coupled external device and information on the selected applications and the selected image data transfer option associated with the coupled external device. Such information may be retrieved when user equipment 100 may determine that a coupled external device is a preregistered device. Such operation will be described in detail with reference to FIG. 8.

Display unit 160 may be an output device for visually displaying information. For example, display unit 160 may display image data produced or processed by video processing unit 140 and/or controller 180. Display unit 160 may receive the image data from at least one of video processing unit 140 and controller 180 and display the received image data. The image data may be produced as a result of certain operations performed by any software programs installed in user equipment 100. For example, the image data may be data processed for displaying a graphic user interface produced by an operation system and applications, performed in user equipment 100. The applications may be referred to as App. Also, the image data may further include still images and moving images, produced or processed by video processing unit 140 and controller 180. For example, display unit 160 may be a liquid crystal display (LCD) panel or an active-matrix organic light-emitting diode (AMOLED) panel, but the present invention is not limited thereto.

In accordance with at least one embodiment of the present invention, display unit 160 may be interrupted so as to display the image data when user equipment 100 is connected to external device 200. For example, display unit 160 may be turned off or transitioned to a sleep mode in response to controller 180 when user equipment 100 is connected to external device 200. Display unit 160 may be turned on again or transition back to an operation mode in response to controller 180 when user equipment 100 is disconnected from external device 200. That is, display unit 160 may be turned off in the pointing device operation mode in accordance with embodiments of the present invention. After turning off display unit 160, controller 180 may transmit image data to external device 200 for displaying on the image data on display unit 210 of external device 200.

In accordance with at least one embodiment of the present invention, display unit 160 may display a graphic user interface for enabling the user to select at least one of several applications and to select one of a positive image data transfer option, a negative image data transfer option, and a mirrored image data transfer option as an image data transfer option associated with the coupled external device. Such graphic user interface may be created by controller 180 and video processing unit 140. The graphic user interface will be described in detail with reference to FIG. 8.

Audio output unit 165 may provide an output audio signal that may be produced or processed by controller 180 as a result of operations performed by an operating system and/or applications installed in user equipment 100. Audio output unit 165 may include a speaker, a receiver, and a buzzer.

Port unit 170 may include at least one port for exchanging signals and/or data with external device 200. In accordance with at least one embodiment of the present invention, port unit 170 may transfer image data and audio data from user equipment 100 to external device 200. Port unit 170 may exchange control data with external device 200. Port unit 170 may be coupled to corresponding port unit 250 of external device 200 in various coupling manners. For example, port unit 170 may be coupled to corresponding port unit 250 of external device 200 through a physical cable. Furthermore, port unit 170 may be directly interlocked with corresponding port unit 250 of external device 200. The present invention, however, is not limited thereto. Port unit 170 may be coupled to corresponding port unit 250 of external device 200 through a radio link formed between user equipment 100 and external device 200. In this case, port unit 170 and port unit 250 may include a signal transmitter and receiver (not shown) for communicating with each other using a communication protocol. Such communication protocol may be Bluetooth®, but the present invention is not limited thereto.

As shown in FIG. 4, port unit 170 may include video input/output port 172, audio input/output port 174, and data input/output port 176, but the present invention is not limited thereto. Such port unit 170 may be embodied in various types. For example, port unit 170 may not include audio input/output interface 174. Further, port unit 170 may include a power port (not shown). In this case, the power port may transfer power from external device 200 to user equipment 100 when external device 200 is coupled to user equipment 100.

In accordance with an embodiment of the present invention, user equipment 100 may be coupled to external device 200 through port unit 170. After user equipment 100 is coupled to external device 200, user equipment 100 may control external device 200 by exchanging data with external device 200 through port unit 170. For example, user equipment 100 may receive inputs from a user through external device 170 and transmit control data to external device 170 through port unit 170. Particularly, user equipment 100 may transmit image data through port unit 170 to external device 200 and control external device 200 to display the image data such a graphic user interface instead of display unit 160 of user equipment 100. Furthermore, user equipment 100 may selectively transfer image data to a coupled external device through port unit 170.

Controller 180 may control overall operation of the constituent elements of user equipment 100. Particularly, controller 180 may perform operations necessary for driving the constituent elements of user equipment 100 in response to inputs received from a related user. Controller 180 may control overall operation of constituent elements of external device 200 when user equipment 100 is connected to external device 200. For example, controller 180 may receive inputs through external device 200, perform an operation in response to the received inputs, and provide the user with the result thereof through external device 200. Particularly, controller 180 may display image data, as a result of operation related to the user inputs, on a display unit of external device 200 when user equipment 100 is connected to external device 200. In order to display the image data on external device 200, controller 180 may include agent 182. Agent 182 may control operations related to connection to external device 200 and controlling external device 200. Such agent 182 may be referred to as a coupling agent or a docking agent, but the present invention is not limited thereto. Agent 182 may be implemented in software. For example, agent 182 may be realized on an application layer in an operating system (OS) structure of user equipment 100. For example, such an OS structure may be an OS structure of an android operating system, but present invention is not limited thereto.

In accordance with embodiments of the present invention, controller 180 may control overall operation for selectively transferring image data produced in user equipment 100 to a coupled external device. For example, controller 180 may determine that user equipment 100 is coupled to an external device upon the reception of the generated detection signal of port unit 170 and set an image data transfer option of the coupled external device based on at least one application and an image data transfer option, which are selected by a user in associated with the coupled external device. Particularly, controller 180 may control constituent elements of user equipment 100 to transfer image data produced by the selected at least one application to the coupled external device when the positive image data transfer option is selected as the image data transfer option associated with the coupled external device. Furthermore, controller 180 may control constituent elements of user equipment 100 to restrict image data produced by the selected at least one application from being transferring to the coupled external device when the negative image data transfer option is selected as the image data transfer option associated with the coupled external device. In addition, controller 180 may control constituent elements of user equipment 100 to transfer image data produced by all of the applications installed in the user equipment to the coupled external device when the mirrored image data transfer option is selected as the image data transfer option associated with the coupled external device. Such operation of controller 180 will be described in detail with reference to FIG. 7 and FIG. 8 in later.

As described above, user equipment 100 may be connected to external device 200, selectively transfer image data produced in user equipment 100 to external device 200, and control external device 200 to display the selectively transferred image data. Hereinafter, external device 200 will be described with reference to FIG. 5. For convenience and ease of understanding, laptop type device 200-2 (FIG. 1) will be representatively described with reference to FIG. 5, but the present invention is not limited thereto. The external device may be any device having a display unit and a coupling interface matched with user equipment 100 as an image data source device. For example, the external device may be a monitor and a large screen TV.

FIG. 5 shows an external device in accordance with at least one embodiment of the present invention.

Referring to FIG. 5, external device 200 may include display unit 210, keypad 230, and at least one port unit 250.

Display unit 210 may display data. Display unit 210 may have a display area larger than that of user equipment 100. For example, display unit 210 may have about 10.1 inch of display area. The present invention, however, is not limited thereto. External device 200 may have a display area smaller than that of user equipment 100. In accordance with at least one embodiment of the present invention, display unit 210 may display selectively transferred image data from user equipment 100 under the control of user equipment 100.

At least one port unit 250 may be coupled to corresponding port unit 170 of exchanging data with user equipment 100. Accordingly, at least one port unit 250 may include a HDMI port and/or a USB port corresponding to port unit 170 of user equipment 100. External device 200 may be capable of receiving data from user equipment 100 through at least one port unit 250 and displaying the received data on display unit 210. External device 200 may have a certain design connectable to user equipment 100 through at least one port unit 250. For example, external device 200 may be attachable to and/or detachable from user equipment 100 as described above with respect to FIG. 1. External device 200 may have a structure for receiving and holding user equipment 100. Such a structure may be referred to as coupling bay 251. External device 200 may be any electronic device that can perform the above operation. For example, external device 200 may include a notebook computer, a laptop computer, a tablet PC, a pad having a touch screen, and a pad having a display unit and a keyboard, but the present invention is not limited thereto. In accordance with at least one embodiment of the present invention, external device 200 may be activated when user equipment 100 is connected to external device 200 and controlled by user equipment 100. Accordingly, external device 200 may have at least constituent elements for necessary operation performed under the control of user equipment 100.

As described above, user equipment 100 may be coupled to external device 200. For example, at least one port unit 170 of user equipment 100 may be coupled to at least one port unit 250 of external device 200. In accordance with at least one embodiment of the present invention, user equipment 100 may be coupled to external device 200 in a docking manner.

Figure 6:
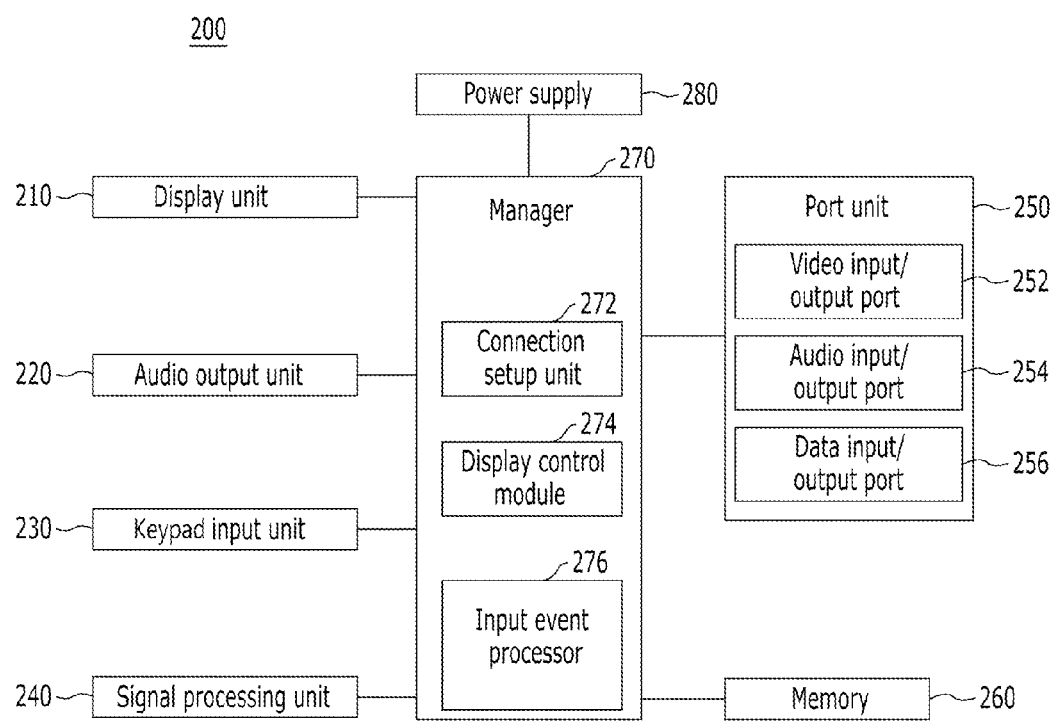
FIG. 6 is a block diagram illustrating an external device in accordance with at least one embodiment of the present invention.

FIG. 6 is a block diagram illustrating an external device in accordance with at least one embodiment of the present invention.

Referring to FIG. 6, external device 200 may include display unit 210, audio output unit 220, keypad input unit 230 (keyboard), signal processing unit 240, port unit 250, memory unit 260, manager 270, and power supply 280. Display unit 210, audio output unit 220, touch input unit 230, keypad input unit 235, memory unit 260, and power supply unit 280 may be analogous to, and perform similar functions to, display unit 160, audio output unit 165, input unit 130, internal memory unit 150, and power supply unit 190 of user equipment 100. Accordingly, the detailed description thereof will be omitted herein. For convenience and ease of understanding, only constituent elements performing distinct operations are described herein.

Port unit 250 may be connected to port unit 170 of user equipment 100. That is, port unit 250 may be a connecting port for forming connectivity between user equipment 100 and external device 200. Accordingly, port unit 250 may be a pair relation with port unit 170 of user equipment 100. Port unit 250 may have the same interface configuration of that of port unit 170 of user equipment 100. For example, port unit 250 may have a HDMI port, a USB port, and an audio port.

Port unit 250 may include video input/output port 252, audio input/output port 254, and data input/output port 256. Video input/output port 252 may receive image data from user equipment 100. Audio input/output port 254 may receive audio signals. Data input/output port 256 may exchange data with user equipment 100. Furthermore, port unit 250 may include a power port (not shown) for transferring power to user equipment 100 and a sensing port (not shown) for sensing connection formed between user equipment 100 and external device 200. The present invention, however, is not limited thereto. For example, port unit 250 may be connected to user equipment 100 through a radio link formed between user equipment 100 and external device 200. In this case, port unit 250 may include a signal transmitter and receiver (not shown) for communicating with each other using a communication protocol. Such communication protocol may be Bluetooth®, but the present invention is not limited thereto.

External device 200 may include coupling bay 251 in accordance with at least one embodiment of the present invention. Port unit 250 may be disposed on one side of coupling bay 251. Coupling bay 215 may have a space for housing user equipment 100. Such coupling bay 215 may be formed on the same side of key pad input unit 230, but the present invention is not limited thereto. User equipment 100 may be inserted into coupling bay 215. In accordance with at least one embodiment of the present invention, port unit 170 of user equipment 100 may be connected with port unit 250 of user equipment 200 when user equipment 100 is completely inserted into coupling bay 251.

Manager 270 may control overall operation for controlling constituent elements of external device 200 when external device 200 is coupled to user equipment 100. In order to perform such control operation, manager 270 may include connection setup unit 272, display control module 274, and input event processor 276 in accordance with embodiments of the present invention.

Connection setup unit 272 may activate the constituent elements of external device 200 when external device 200 initially senses that external device 200 is connected to user equipment 100. For example, connection setup unit 272 may supply power to the constituent elements of external device 200. That is, connection setup unit 272 may transit a waiting state of external device 200 to a wakeup state of external device 200. Accordingly, connection setup unit 272 may establish a host-device connection between user equipment 100 and external device 200.

External device 200 may provide a graphic user interface substantially identical to displayed on user equipment 100 when external device 200 is connected to user equipment 100. In such a connected state, image data displayed on display unit 160 of user equipment 100 may be transferred to and displayed on display unit 210 of external device 200. In order to display the transferred image data on display unit 210, manager 270 may include display control module 274. Display control module 274 may turn on display unit 210 under control of manager 270 when external device 200 is connected to user equipment 100. Then, manager 274 may receive the image data displayed on display unit 160 of user equipment 100 from user equipment 100 and display the received image data on display unit 210 of external device 200.

When external device 200 receives input events such as a touch input in a connected state through keypad input unit 230, input event processing unit 276 may generate an event signal corresponding to the input events and transfer the generated event signal to user equipment 100. The generate event signal may be a signal for controlling operation of user equipment 100 corresponding to the received input events.

In accordance with an embodiment of the present invention, external device 200 may not operate in a disconnected mode. The disconnected mode may denote that user equipment 100 is not connected to external device 200. Accordingly, external device 200 may be a dummy device. In this case, external device 200 may include minimum elements for performing essential functions such as display control and touch input control. The present invention, however, is not limited thereto. External device 200 may be embodied as an independent device installed with an operating system (OS) that allows external device 200 operating in a standalone device. For example, external device 200 may operate as a moving image player or a MP3 player when external device 200 is not coupled to user equipment 100. When external device 200 is coupled to user equipment 100, external device 200 may perform certain operations of user equipment 100 in response to the control of user equipment 100 in accordance with embodiments of the present invention.

As described above, image data may be selectively transferred from an image data source device such as user equipment to a coupled external device in accordance with at least one embodiment of the present invention. Hereinafter, such operation will be described with reference to FIG. 7.

Figure 7:
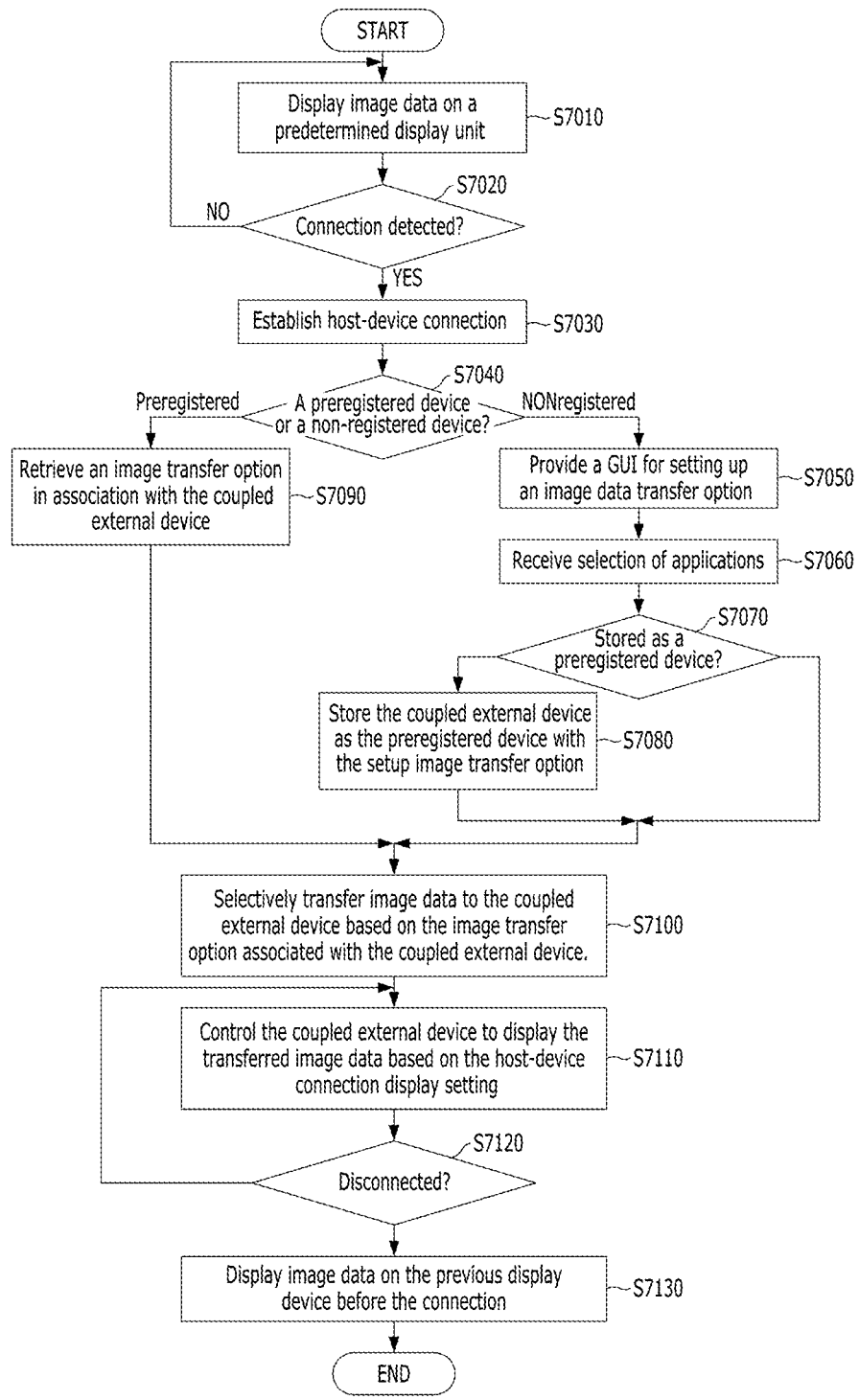
FIG. 7 shows a method for selectively transferring image data from user equipment to a coupled external device in accordance with at least one embodiment of the present invention.

FIG. 7 shows a method for selectively transferring image data from user equipment to a coupled external device in accordance with at least one embodiment of the present invention.

Referring to FIG. 7, image data may be displayed on a predetermined display unit at step S7010. For example, user equipment 100 may perform operations in response to user inputs in a standalone mode when user equipment 100 is not coupled to external device 200. That is, user equipment 100 may produce image data as a result of running applications including an associated operating system, selected by a user, and in response to user inputs. User equipment 100 may display the produced image data on display unit 160 of user equipment 100. Alternatively, user equipment 100 may be previously coupled to an external device and display the produced image data on a display unit of the coupled external device. In this case, the external device may be a specific docking device designed for user equipment 100. For example, such an external device may be laptop computer 200-2 and pad-type device 200-1 shown in FIG. 1. Although user equipment 100 may be coupled to an external device through the hub device, such connection between user equipment 100 and the external device may be established in the similar manner shown in FIG. 8 and user equipment 100 may transfer image data to the external device in the similar manner shown in FIG. 7. Such operation will be described in more detail later.

At step S7020, determination may be made whether to detect connection to an external device. For example, when user equipment 100 is directly coupled to external device 200, port unit 170 of user equipment 100 may be coupled to corresponding port unit 250 of external device 200. In this case, user equipment 100 may detect such physical connection to external device 200 based on a detection signal generated at port unit 170 of user equipment 100. The present invention, however, is not limited thereto. User equipment 100 may detect connection to external device 200 based on communications with external device 200. In addition, user equipment 100 may detect connection to external device 200 by exchanging a request message and a response message through a wireless link. When a docking device is already coupled to user equipment 100 as a hub device as shown in FIG. 2 and another external device is coupled to such a hub device, the docking device may detect such connection to external device 200 in the same manner described above. After detection, such a hub device may inform of the detected connection to user equipment 100.

When connection to external device 200 is not detected (No—S7020), user equipment 100 may continuously transfer the image data to the predetermined device at step S7010.

When connection to external device 200 is detected, host-device connection may be established at step S7030. For example, controller 180 of user equipment 100 may establish the host-device connection between user equipment 100 and external device 200. By establishing the host-device connection, an operation environment similar or about identical to that of user equipment 100 may be provided to a user through external device 200. User equipment 100 may be described as a host device in accordance with embodiments of the present invention. For example, when external device 200 is a laptop computer and when a user wants to use user equipment 100 as a mouse or a touch pad, user equipment 100 may operate as a host device. The present invention, however, is not limited thereto. External device 200 connected to user equipment 100 may be a host device in accordance with another embodiment of the present invention. Such establishing the host-device connection will be described in more detail with reference to FIG. 8.

At step S7040, determination may be made as to whether the coupled external device is a preregistered device or a non-registered device. For example, the preregistered device may denote a device that is previously registered with an image data transfer option. Such information on registration and the associated image data transfer option may be stored in memory 150 of user equipment 100 in association with device information of the coupled external device, such as a device ID. Controller 180 of user equipment 100 may search the information on a list of the preregistered devices through memory 150 based on the device information received from coupled external device 200. Such device information may be received during establishing a host-device connection.

The image data transfer option may denote a list of applications, selected by a user or selected by a default setting of a manufacturer. User equipment 100 may transfer image data to external device 200 based on the image data transfer option. For example, user equipment 100 may transfer image data only produced by applications included in the image data transfer option (e.g., a positive image data transfer option). Furthermore, user equipment 100 may restrict image data produced by applications included in the image data transfer option from transferring to external device 200 (e.g., a negative image data transfer option). In addition, the image data transfer option may be set up to transfer all image data to external device 200 (e.g., a mirrored transfer option). In this case, external device 200 may display the mirrored image data of user equipment 100. When the preregistered device may be a device highly trusted by a user, such preregistered device may be registered with the mirrored image data option. For example, a docking device specially designed for user equipment 100 may be a preregistered device with the mirrored image data option in accordance with at least one embodiment of the present invention. Such docking device may be designed for enhancing performance of user equipment 100, such as a wider screen size, a wider touch pad, and so forth. For example, such docking device may be laptop device 200-2 and pad type device 200-1 shown in FIG. 1. Accordingly, such docking device can be a device registered with the mirrored image data option.

At step S7050, a graphic user interface (GUI) for setting up an image data transfer option may be provided when the coupled external device is the non-registered device (Non-registered device—S7040). For example, the GUI may provide a list of applications installed in user equipment 100 to a user. The user of user equipment 100 may select applications in the provided list for transferring image data to external device 200 to be displayed. That is, image data only produced as a result of running the selected application may be transferred to external device 200 in accordance with at least one embodiment of the present invention. The selected application may be stored as an image data transfer option associated with the coupled external device.

Furthermore, he GUI may provide three image data transfer options: a positive image data transfer option, a negative image data transfer option, and a mirrored image data transfer option. In the positive image data transfer option, a user may select applications to transfer image data thereof to the coupled external device. That is, in the positive image data transfer option, user equipment 100 may transfer image data only produced by applications included in the image data transfer option. In the negative image data transfer option, a user may select application not to transfer image data thereof to the coupled external device. That is, in the negative image data transfer option, user equipment 100 may restrict image data produced by applications included in the image data transfer option from transferring to external device 200. In the mirrored image data transfer option, a user may select all of applications to transfer image data thereof to the coupled external device. That is, in the mirrored transfer option, user equipment 100 may transfer entire image data produced by all applications to the coupled external device.

At step S7060, selection of applications may be received. For example, user equipment 100 may receive the selections of applications within the GUI from the user. Furthermore, user equipment 100 may receive the user input for selecting one of the three image data transfer options: the positive image data transfer option, the negative image data transfer option, and the mirrored image data transfer options. Based on the received selections, user equipment 100 may set up as an image transfer option associated with the coupled external device.

At step S7070, determination may be made as to whether the coupled external device is stored as a preregistered device or not. For example, user equipment 100 may inquire a user whether the coupled external device is stored as a preregistered device or not. When the user frequently uses the coupled external device, the user may want to register the coupled external device as the preregistered device for convenience.

At step S7080, the coupled external device may be stored as the preregistered device with the setup image transfer option when the user wants to store the coupled external device as the preregistered device (Yes—S7070). For example, when the user wants to register the coupled external device as the preregistered device, user equipment 100 may store information on the coupled external device with the set image data transfer option in memory 150 in accordance with at least one embodiment of the present invention. Such information may include a device ID of the coupled external device and the image data transfer option associated with the coupled external device. Such device ID of the coupled external device may be obtained during establishing host-device connection at step S 7030.

At step S7090, an image transfer option may be retrieved in association with the coupled external device when the coupled external device is the preregistered device (Preregistered device—S7040). For example, when the coupled external device is the preregistered device, user equipment 100 may retrieve information on the image transfer option from memory 150 based on the device ID of the coupled external device.

At step S7100, image data may be selectively transferred to the coupled external device based on the image transfer option associated with the coupled external device. For example, user equipment 100 may selectively transfer image data based on the retrieved image data transfer option associated with the coupled external device in accordance with at least one embodiment of the present invention. Particularly, user equipment 100 may select applications based on the retrieved image data transfer option and transfer image data produced by the selected applications to the coupled external device when the retrieved image data transfer option is the positive image data transfer option. User equipment 100 may select applications based on the retrieved image data transfer option and restrict image data produced by the selected applications from being transferred to the coupled external device when the retrieved image data transfer option is the negative image data transfer option. That is, user equipment 100 may transfer image data produced by unselected applications to the coupled external device. Furthermore, user equipment 100 may transfer all image data to the coupled external device when the retrieved image data transfer option is the mirrored image data transfer option.

At step S7110, the coupled external device may be controlled to display the transferred image data based on the host-device connection display setting. For example, user equipment 100 may control the coupled external device to display the transferred image data based on the host-device connection display setting in accordance with at least one embodiment of the present invention. The host-device connection display setting may be set during establishing the host-device connection. Such operation will be described in more detail with reference to FIG. 8.

The image data may be continuously displayed on the coupled external device until user equipment 100 is disconnected from the coupled external device. When user equipment 100 determines that the coupled external device is disconnected from user equipment 100 at step S7120, image data may be displayed on the original display device at step S7130. For example, controller 180 may change the connected mode to the standalone mode and perform operations in the standalone mode. When the connected mode is changed to the standalone mode, controller 180 may continuously display image data produced by all applications in user equipment 100 on display unit 160 of external device 100. When user equipment 100 was previously coupled to the hub device before the hub device is coupled to the external device, the hub device may continuously display image according to the image data transfer option associated with the hub device in accordance with at least one embodiment of the present invention.

Furthermore, controller 180 of user equipment 100 may store last states of interrupted operations performed through external device 200 before changing the connected mode to the standalone mode in accordance with at least one embodiment of the present invention. User equipment 100 may continuously perform the interrupted operations based on the stored last states of the interrupted operations and display the produced image data on display unit 160.

The negative image data transfer option may be suitable for restricting personal applications such as a text message application or an e-mail application. For example, when such a text message application and an e-mail application are selected and set as the negative image data transfer option, user equipment 100 may not transfer image data produced by the text message application and the e-mail application. Accordingly, the negative image data transfer option may be useful for blocking image data containing personal contents from being displayed on a display unit of the coupled external device.

The positive image data transfer option may be suitable for displaying image data produced by one specific application. For example, a user wants to display a presentation material on a large sized screen for presenting the presentation material with other audiences. For example, when such a document reader application for presenting a presentation material such as a document of Microsoft Word® or a document of Microsoft Power Point® is selected and set as the positive image data transfer option, user equipment 100 may transfer image data produced only by the document reader application and display the transferred image data on a large sized monitor. Within the positive image data transfer option, although a text message is received while displaying the image data on the large sized monitor, the received text message is not displayed on the large sized monitor. Furthermore, a user needs to search a specific file through a plurality of holders in user equipment 100 while displaying image data of a specific application. Within the positive image data transfer option, such searching process is not shown on the display unit of the coupled external device which may be shown with the typical method such as the mirrored image data transfer option.

In accordance with at least one embodiment of the present invention, user equipment 100 may transfer image data produced by a lastly selected application when multiple applications are selected as the positive image data transfer option. For example, when a user selects two applications such as a document editing application and a scheduling application with the positive image data transfer option and when the user runs both of the selected applications, image data produced by the lastly selected one of the two applications is only transferred to the coupled external device.

As descried above, user equipment 100 may determine whether the coupled external device is a preregistered device or a non-registered device at step S7040. The present invention, however, is not limited thereto. Such step S7040 may be omitted in another embodiment of the present invention. In this case, the GUI for setting up the image data transfer option may be provided (S7050) right after establishing the host-device connection (S7030). Furthermore, steps S7070 and S7080 may be omitted as well.

After detecting the connection to the external device, the host-device connection may be established as described in step S7030. Such operation will be described in more detail with reference to FIG. 8.

Figure 8:
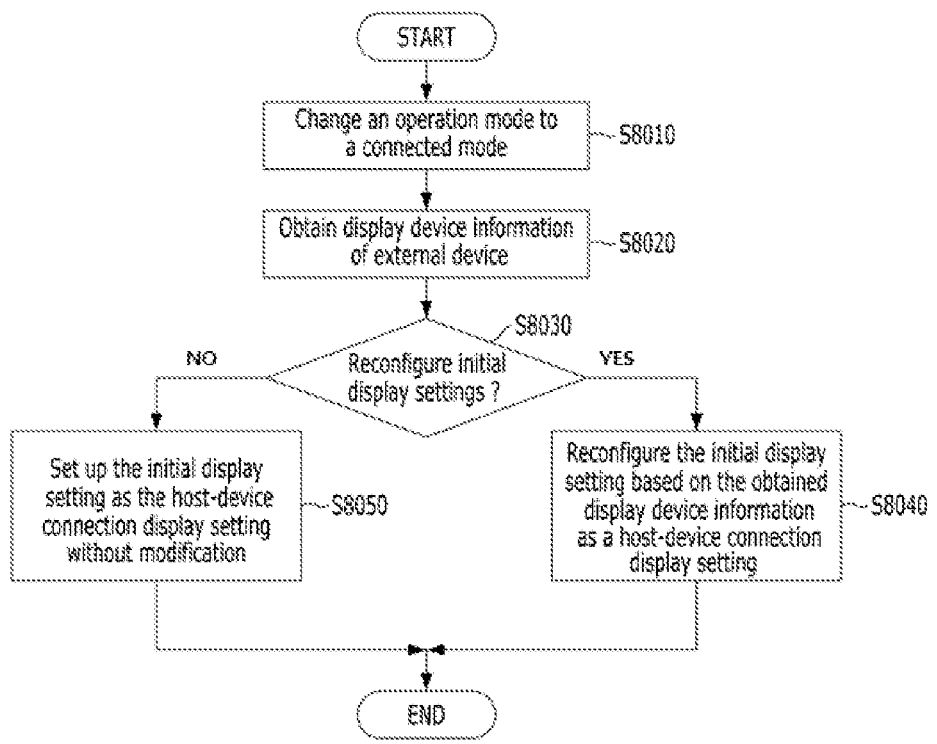
FIG. 8 shows a method for establishing host-device connection at least one embodiment of the present invention.

FIG. 8 shows a method for establishing host-device connection at least one embodiment of the present invention.

Referring to FIG. 8, when the detection of the connection to external device 200 is detected (Yes—S7020 of FIG. 7), an operation mode may be changed to a connected mode at step S8010. For example, controller 180 may change the operation mode to the connected mode when controller 180 senses the connection to external device 200. The connected mode may be opposite to a standalone mode or a disconnected mode. The connected mode may denote an operation mode of user equipment 100 when user equipment 100 is coupled to external device 200.

At step S8020, display device information of external device may be obtained. For example, the display device information of external device 200 may include information on a screen size, a resolution, a display direction, and a dot per inch (DPI) of display unit 210 of external device 200. Such display device information may be obtained through request. Particularly, user equipment 100 may request display unit information to external device 200 and obtain the display unit information from external device 200. Alternatively, user equipment 100 may identify a display unit type of external device 200 and retrieve related display unit information from internal memory 150. Particularly, agent 182 may request and receive display unit information from external device 200. Based on the display unit information, agent 182 may identify hardware specification of display unit 210 of external device 200. For example, agent 182 may receive extended display identification data (EDID) from external device 200. The EDID may be information on hardware specification of display unit 210 of external device 200. The EDID may include information on a manufacturer, a model number, an EDID version, an appropriate DPI value, a screen size, supporting screen resolutions, luminance, and the number of pixels. The present invention, however, is not limited thereto. For example, user equipment 100 may store, in internal memory 150, display unit information of candidate external devices that might be connected to user equipment 100. The stored display unit information may be mapped to a device ID of each candidate external device. Such mapping information may be managed by agent 182 of user equipment 100. In this case, user equipment 100 may receive or recognize a device ID of external device 200. Based on the device ID, user equipment 100 may obtain the display unit information of display unit 210 of external device 200 from the stored display unit information.

At step S8030, determination may be made as to whether it is necessary to reconfigure initial display settings based on the obtained display device information. For example, controller 180 may determine whether it is necessary to reconfigure an initial display setting based on the obtained information.

When it is necessary to reconfigure the initial display setting (Yes-S8030), the initial display setting may be reconfigured based on the obtained display device information as a host-device connection display setting at step S8040. For example, controller 180 may reconfigure the initial display setting based on the obtained display device information of external device 200. After reconfiguration, the host-device connection display setting is stored in memory 150 of user equipment 100.

When reconfiguration is not necessary (No—S8030), the initial display setting may be used as the host-device connection display setting without modification at step S8050. For example, controller 180 may store the initial display setting as the host-device connection display setting in memory 150 of user equipment 100.

The host-device connection display setting stored in memory 150 may be retrieved and used for displaying the selectively transferred image data on the coupled external device at step S7110 (FIG. 7) in accordance with at least one embodiment of the present invention.

When user equipment 100 operates in a standalone mode, user equipment 100 may display image data based on the initial display setting of display unit 160 of user equipment 100. After user equipment 100 is connected to external device 200, user equipment 100 may display the selectively transferred image data on display unit 210 of external device 200 based on the host-connection display setting. User equipment 100 may be required to reconfigure the initial display setting based on a resolution of display unit 210 of external device 200. When a resolution of display unit 210 of external device 200 is identical to or compatible to that for display unit 160 of user equipment 100, reconfiguration of image data may not be necessary.

In addition to the resolution, displaying setting may be reconfigured based on other parameters included in the obtained display device information, for example, a screen size, a display direction, and a DPI. For example, display unit 160 of user equipment 100 may have a screen size different from display unit 210 of external device 200. In this case, such display setting may be reconfigured based on the screen size for display unit 210 of external device 200.

Furthermore, it may be necessary to modify image data produced for display unit 160 of external device 200, to be suitable for display unit 210 of external device 200. In this case, video processing unit 140 may process the image data based on the display setting, including a screen size, a display direction, and a DPI, suitable for display unit 210 of external device 200 and transmit the processed image data to external device 200. Alternatively, controller 180 may transmit image data created for display unit 160 of user equipment 100 to external device 200 without reconfiguration and external device 200 may reconfigure the received image data based on a DPI for display unit 210 of external device 200. Such operation may be performed through signal processing unit 240 of external device 200.

In accordance with at least one embodiment of the present invention, display unit 210 of external device 200 may optimally display images through reconfiguring image data based on a resolution and a DPI of display unit 210 of external device 200. In addition to the resolution and the DPI, a display direction may be considered to create or to reconfigure image data in accordance with embodiments of the present invention.

For example, user equipment 100 such as a smart phone may have a portrait display direction as a default display direction. External devices 200 such as laptop notebook or tablet PC, known as a smart pad, may have a landscape display direction as a default display direction. When such a default display direction is different between user equipment 100 and external device 200, agent 182 may i) obtain information on a default display direction of display unit 210 of external device 200 based on the obtained display unit information including a resolution, a screen size, and product identification and ii) determine whether the default display direction of external device 200 is identical to or different from that of user equipment 100 based on the obtained display device information. When the default display direction is not identical, and iii) controller 180 may reconfigure image data based on the default display direction of external device 200 in addition to the resolution and the DPI of external device 200.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a controlling unit, a controlling unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose controlling unit, the program code segments combine with the controlling unit to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for selectively transferring image data from user equipment to a coupled external device, the method comprising:
    determining whether user equipment is coupled to an external device based on a detection signal that is generated by the user equipment when the user equipment is coupled to the external device through at least one of direct connection, indirect connection, and wireless connection;
    determining whether the coupled external device is a preregistered device or a non-registered device when the user equipment is determined as being coupled to the external device;
    retrieving, from a memory of the user equipment, information on at least one application and an image data transfer option selected with respect to the coupled external device when the coupled external device is determined as the preregistered device;
    receiving selection inputs from a user for i) selecting at least one of applications installed in and simultaneously running in the user equipment and ii) selecting an image data transfer option to be applied to the selected at least one of the applications, when the user equipment is determined as the non-registered device; and
    selectively transferring image data produced in the user equipment to the external device by performing, according to the selected image data transfer option identified by the retrieved information or the received user selection inputs, one of i) transmitting image data produced by the selected at least one application, identified by the retrieved information or the received user selection inputs, to the external device and ii) restricting the image data produced by the selected at least one application from being transmitted to the external device while transmitting unselected image data produced by unselected applications,
    wherein the user equipment has a dedicated display unit for displaying data processed by the user equipment, and the external device has a display unit which is different from the dedicated display unit of the user equipment; and
    wherein the selected image data transfer option identified by the received information or the received user selection inputs includes information indicating allowance or restriction on transmission of the image data produced by the selected at least one application to the external device.

2. The method of claim 1, further comprising:
    controlling the coupled external device to display the selectively transferred image data on the display unit of the coupled external device.

3. The method of claim 1, wherein the receiving selection inputs from a user includes:
    providing a user interface to the user for selecting at least one of the applications and for selecting one of a positive image data transfer option, a negative image data transfer option, and a mirrored image data transfer option, as an image data transfer option associated with the coupled non-registered external device; and
    receiving the selection inputs for selecting at least one of the applications and for setting the image data transfer option.

4. The method of claim 3, including:
    determining whether the user wants to register the coupled non-registered external device as a preregistered device with information on the selected applications and the selected image data transfer options after the receiving the selection inputs; and
    storing the coupled external device as the preregistered device and the information on the selected applications and the selected image data transfer option in the memory of the user equipment when the user wants to register the coupled non-registered external device as a preregistered device.

5. The method of claim 3, wherein the selectively transferring image data includes:
    transferring image data produced by the selected at least one of the applications to the coupled external device when the positive image data transfer option is selected as the image data transfer option associated with the coupled external device.

6. The method of claim 3, wherein the selectively transferring image data includes:
    restricting image data produced by the selected at least one of the applications from transfer to the coupled external device when the negative image data transfer option is selected as the image data transfer option associated with the coupled external device.

7. The method of claim 3, wherein the selectively transferring image data includes:
    transferring image data produced by all of the applications installed in the user equipment to the coupled external device when the mirrored image data transfer option is selected as the image data transfer option associated with the coupled external device.

8. The method of claim 1, comprising:
    establishing a host-device connection when the user equipment is determined as being coupled to an external device.

9. The method of claim 8, wherein the establishing includes:
    obtaining display device information of the coupled external device;
    determining whether to reconfigure an initial display setting of the user equipment based on the obtained display device information;
    reconfiguring the initial display setting based on the obtained display device information and storing as a host-device connection display setting associated with the coupled external device when the reconfiguration is necessary;

otherwise, storing the initial display setting as the host-device connection display setting associated with the coupled external device.

10. The method of claim 9, including:
controlling the coupled external device to display the selectively transferred image data on a display unit of the coupled external device based on the host-device connection display setting.

11. The method of claim 9, wherein the display device information includes a device identity (ID), a screen size, a display direction, and a dot per inch (DPI).

12. A user equipment for selectively transferring image data to a coupled external device, the user equipment comprising:
an interface unit configured to be connected to a corresponding interface unit of an external device, to generate a detection signal when the user equipment is coupled to an external device through at least one of direct connection, indirect connection, and wireless connection, to transmit and receive data to/from an external device, and to transfer image data produced by applications installed in the user equipment to a coupled external device;
a touch screen panel configured to receive selection inputs from a user i) for selecting at least one of applications and ii) for selecting one of a positive image data transfer option, a negative image data transfer option, and a mirrored image data transfer option as an image data transfer option;
a display unit configured to display image data produced by applications installed in the user equipment and to display a user interface for enabling the user to select at least one of applications and to select one of a positive image data transfer option, a negative image data transfer option, and a mirrored image data transfer option as an image data transfer option associated with the coupled external device;
a controller configured to determine that the user equipment is coupled to an external device upon the reception of the generated detection signal of the interface unit, to set an image data transfer option of the coupled external device based on the received selection input with the selected at least one applications, and to selectively transfer image data produced in the user equipment based on the set image data transfer option with the selected application to the coupled external device by performing one of i) transmitting image data produced by the selected at least one of the applications to the external device and ii) restricting the image data produced by the selected at least one application from being transmitted to the external device while transmitting unselected image data produced by unselected applications; and
a memory configured to store information on a coupled external device and information on the selected application and the selected image data transfer option associated with a coupled external device,
wherein the controller is configured to:
determine whether the coupled external device is a pre-registered device or a non-registered device after detecting the connection to the external device;
retrieve, from the memory, information on at least one selected application and a selected image data transfer option associated with the coupled external device when the coupled external device is determined as a preregistered device; and
selectively transfer image data produced in the user equipment to the coupled preregistered external device based on the retrieved information on the at least one selected application and the selected image data transfer option.

13. The user equipment of claim 12, wherein the controller is configured to:
transfer image data produced by the selected at least one application to the coupled external device when the positive image data transfer option is selected as the image data transfer option associated with the coupled external device;
restrict image data produced by the selected at least one application from being transferring to the coupled external device while transmitting image data produced by unselected applications installed and simultaneously running with the selected at least one application in the user equipment when the negative image data transfer option is selected as the image data transfer option associated with the coupled external device; and
transfer image data produced by all of the applications installed in the user equipment to the coupled external device when the mirrored image data transfer option is selected as the image data transfer option associated with the coupled external device.

14. The user equipment of claim 12, wherein the controller is configured to:
provide, through the display unit, the user interface for selecting applications and for selecting one of a positive image data transfer option, a negative image data transfer option, and a mirrored image data transfer option, as an image data transfer option associated with the coupled external device when the coupled external device is the non-registered device.

15. The user equipment of claim 12, wherein the controller is configured to:
obtain display device information of the coupled external device upon the receipt of the detection signal from the interface unit;
determine whether to reconfigure an initial display setting of the display unit of the user equipment based on the obtained display device information;
reconfigure the initial display setting based on the obtained display device information and store as a host-device connection display setting associated with the coupled external device when the reconfiguration is required;
otherwise, store the initial display setting as the host-device connection display setting associated with the coupled external device.

16. The user equipment of claim 15, wherein the controller is configured to:
control the coupled external device to display the selectively transferred image data on a display unit of the coupled external device based on the host-device connection display setting.

17. A method for selectively transferring image data from user equipment to a coupled external device, the method comprising:
determining whether user equipment is coupled to an external device based on a detection signal that is generated by the user equipment when the user equipment is coupled to the external device through at least one of direct connection, indirect connection, and wireless connection;

determining whether the coupled external device is a preregistered device or a non-registered device when the user equipment is determined as being coupled to the external device;

transferring image data produced by all applications installed in the user equipment to the coupled external device when the coupled external device is determined as the preregistered device; and performing a selective transfer of image data produced in the user equipment to the external device, based on user selection information when the user equipment is determined as the non-registered device, wherein the performing includes:

receiving selection inputs from a user for i) selecting at least one of applications installed in and simultaneously running in the user equipment and ii) selecting an image data transfer option to be applied to the selected at least one of the applications, wherein the image data transfer option includes information indicating allowance or restriction on transmission of image data produced by the selected at least one application to the external device; and selectively transferring the image data produced in the user equipment to the external device by performing, according to the selected image data transfer option, one of i) transmitting the image data produced by the selected at least one application to the external device and ii) restricting the image data produced by the selected at least one application from being transmitted to the external device while transmitting unselected image data produced by unselected applications.

18. The method of claim 17, wherein the image data transfer option includes at least one of a positive image data transfer option and a negative image data transfer option.

* * * * *